(12) United States Patent
Martin et al.

(10) Patent No.: US 9,791,896 B2
(45) Date of Patent: Oct. 17, 2017

(54) DEVICE AND METHOD FOR PERFORMING A FUNCTIONALITY

(71) Applicant: Symbol Technologies, Inc., Schaumburg, IL (US)

(72) Inventors: Richard M. Martin, New Hyde Park, NY (US); Jaeho Choi, Whitestone, NY (US); Ian R. Jenkins, Stony Brook, NY (US); Adam J. Karnas, Brooklyn, NY (US); Shane E. MacGregor, Long Island City, NY (US); Alexander R. Spiro, Astoria, NY (US); Konstantinos D. Tsiopanos, Selden, NY (US)

(73) Assignee: Symbol Technologies, LLC, Holtsville, NY (US)

( * ) Notice: Subject to any disclaimer, the term of this patent is extended or adjusted under 35 U.S.C. 154(b) by 15 days.

(21) Appl. No.: 13/684,658

(22) Filed: Nov. 26, 2012

(65) Prior Publication Data

US 2014/0145925 A1 May 29, 2014

Related U.S. Application Data

(60) Provisional application No. 61/741,163, filed on Jul. 13, 2012.

(51) Int. Cl.
 G06F 3/0346 (2013.01)
 G06F 3/01 (2006.01)
 G06F 1/16 (2006.01)

(52) U.S. Cl.
 CPC ............ G06F 1/1694 (2013.01); G06F 3/017 (2013.01); G06F 3/0346 (2013.01); *G06F 2200/1637* (2013.01)

(58) Field of Classification Search
 CPC .. G06F 1/16; G06F 3/0482; G06F 2200/1614; G09G 5/00

(Continued)

(56) References Cited

U.S. PATENT DOCUMENTS

| 4,097,133 A | 6/1978 | Stemme et al. |
| 4,282,425 A | 8/1981 | Chadima et al. |

(Continued)

FOREIGN PATENT DOCUMENTS

| EP | 1225501 A2 | 7/2002 |
| GB | 2299394 A | 10/1996 |

(Continued)

OTHER PUBLICATIONS

Non Final Office Action dated Aug. 22, 2013 in U.S. Appl. No. 13/685,750, Richard M Martin, filed Nov. 22, 2012.

(Continued)

*Primary Examiner* — Bryan Earles (57) ABSTRACT

A device and method performs a predefined functionality. The method includes generating a first view including selectable elements corresponding to a predefined functionality with first position data and first orientation data shown on a display device. The method includes determining a movement of the display device relative to a user. The method includes generating a second view including at least one of the selectable elements with second position data and second orientation data based on the first image data and the movement data, the second position and orientation data being the same as the first position and orientation data, respectively, relative to the user. The method includes selecting one of the at least one of the selectable elements of the second view as a function of the second position data and the second orientation data and executing the predefined functionality corresponding to the selected one of the selectable elements.

19 Claims, 4 Drawing Sheets

(58) Field of Classification Search
USPC .................................................. 345/156
See application file for complete search history.

(56) References Cited

U.S. PATENT DOCUMENTS

| | | | |
|---|---|---|---|
| 5,035,181 A | 7/1991 | Jacks et al. | |
| 5,204,531 A | 4/1993 | Elings et al. | |
| 5,250,790 A | 10/1993 | Melitsky et al. | |
| 5,340,972 A | 8/1994 | Sandor | |
| 5,770,848 A | 6/1998 | Oizumi et al. | |
| 5,801,918 A | 9/1998 | Ahearn et al. | |
| 5,905,248 A | 5/1999 | Russell et al. | |
| 5,970,184 A | 10/1999 | Katoh et al. | |
| 6,085,981 A | 7/2000 | Knowles et al. | |
| 6,115,025 A | 9/2000 | Buxton et al. | |
| 6,184,654 B1 | 2/2001 | Bachner et al. | |
| 6,223,987 B1 | 5/2001 | Knowles et al. | |
| 6,286,760 B1 | 9/2001 | Schmidt et al. | |
| 6,421,234 B1 | 7/2002 | Ricks et al. | |
| 6,502,754 B1 | 1/2003 | Bhatia et al. | |
| 6,518,952 B1 | 2/2003 | Leiper | |
| 6,575,369 B1 | 6/2003 | Knowles et al. | |
| 6,607,134 B1 | 8/2003 | Bard et al. | |
| 6,648,229 B1 | 11/2003 | Knowles et al. | |
| 6,726,070 B2 | 4/2004 | Lautner | |
| 6,754,069 B2 | 6/2004 | Harada | |
| 6,853,293 B2 | 2/2005 | Swartz et al. | |
| 7,065,299 B2 | 6/2006 | Schluter et al. | |
| 7,157,705 B2 | 1/2007 | Hamrelius et al. | |
| 7,191,947 B2 | 3/2007 | Kahn et al. | |
| D540,838 S | 4/2007 | Aronsson et al. | |
| 7,250,603 B1 | 7/2007 | Nugent | |
| 7,389,933 B2 | 6/2008 | Wang | |
| 7,490,776 B2 | 2/2009 | Thuries | |
| 7,562,824 B2 | 7/2009 | Bhatia et al. | |
| 7,566,009 B2 | 7/2009 | Lapstun et al. | |
| 7,679,604 B2* | 3/2010 | Uhlik ..................... | G01P 13/00 345/156 |
| 7,746,511 B2 | 6/2010 | Hamilton et al. | |
| 7,748,632 B2 | 7/2010 | Coleman et al. | |
| 7,764,488 B2 | 7/2010 | Calvarese | |
| 7,867,019 B1 | 1/2011 | Loukusa et al. | |
| 7,886,377 B2 | 2/2011 | Hamberg et al. | |
| D658,222 S | 4/2012 | Elrod et al. | |
| D665,440 S | 8/2012 | Sigward | |
| 8,255,836 B1 | 8/2012 | Gildfind | |
| 8,314,817 B2* | 11/2012 | Williamson et al. ......... | 345/659 |
| 8,717,283 B1* | 5/2014 | Lundy ..................... | G06F 3/017 345/156 |
| 9,035,878 B1* | 5/2015 | Wheeler ............... | G06F 3/0484 345/156 |
| 2001/0048423 A1* | 12/2001 | Rekimoto .......... | G01C 21/3635 345/157 |
| 2002/0140666 A1* | 10/2002 | Bradski ................. | G06F 1/1626 345/156 |
| 2002/0140668 A1 | 10/2002 | Crawford | |
| 2002/0165436 A1 | 11/2002 | Schluter et al. | |
| 2003/0020707 A1* | 1/2003 | Kangas .................. | G06F 3/011 345/418 |
| 2003/0179178 A1 | 9/2003 | Zargham | |
| 2004/0129903 A1 | 7/2004 | Diamantstein et al. | |
| 2005/0001036 A1 | 1/2005 | Blake et al. | |
| 2006/0197753 A1 | 9/2006 | Hotelling | |
| 2007/0067745 A1 | 3/2007 | Choi et al. | |
| 2008/0078839 A1 | 4/2008 | Barkan | |
| 2008/0128492 A1 | 6/2008 | Roth et al. | |
| 2008/0128499 A1 | 6/2008 | Chen et al. | |
| 2008/0128512 A1 | 6/2008 | Schmidt et al. | |
| 2008/0163504 A1 | 7/2008 | Smith | |
| 2009/0033633 A1 | 2/2009 | Newman | |
| 2009/0039162 A1 | 2/2009 | Yen | |
| 2009/0102925 A1 | 4/2009 | Sheard | |
| 2009/0262074 A1* | 10/2009 | Nasiri ..................... | A63F 13/06 345/158 |
| 2009/0307634 A1 | 12/2009 | Strandell | |
| 2010/0026498 A1 | 2/2010 | Bellows et al. | |
| 2010/0037184 A1* | 2/2010 | Sie ................................ | 715/863 |
| 2010/0046577 A1 | 2/2010 | Sheard | |
| 2010/0171021 A1 | 7/2010 | Smith | |
| 2010/0277506 A1 | 11/2010 | Yao | |
| 2010/0328344 A1* | 12/2010 | Mattila ................. | G06F 1/1626 345/633 |
| 2011/0075339 A1 | 3/2011 | Lam | |
| 2011/0164056 A1 | 7/2011 | Ording et al. | |
| 2011/0246336 A1 | 10/2011 | Callaghan | |
| 2011/0290889 A1 | 12/2011 | Tamburrini et al. | |
| 2012/0032982 A1* | 2/2012 | Williamson et al. ......... | 345/650 |

FOREIGN PATENT DOCUMENTS

| | | |
|---|---|---|
| GB | 2358336 A | 7/2001 |
| GB | 2396728 A | 6/2004 |
| WO | 9314472 A1 | 7/1993 |
| WO | 0127735 A1 | 4/2001 |
| WO | 2004066615 | 8/2004 |
| WO | 2007061498 A2 | 5/2007 |

OTHER PUBLICATIONS

Leenes R., et al., "Prime white paper," EU Project Prime, Privacy and Identity Management for Europe, Third and Final Version, May 15, 2008, 22 pages.

Office action for German Patent Application No. 112013003511.1 dated Aug. 10, 2016.

International Search Report and Written Opinion dated Oct. 10, 2013 in counterpart PCT application No. PCT/US2013/049945.

* cited by examiner

DEVICE AND METHOD FOR PERFORMING A FUNCTIONALITY

CROSS-REFERENCE TO RELATED APPLICATIONS

This application claims priority to U.S. Provisional Patent Application Ser. No. 61/741,163 filed Jul. 13, 2012, entitled, "MOBILE COMPUTING DEVICE INCLUDING AN ERGONOMIC HANDLE," the contents of which are expressly incorporated herein by reference in their entirety.

FIELD OF THE DISCLOSURE

The invention relates to a mobile unit performing a functionality from a movement of the mobile unit that changes a view of a display device.

BACKGROUND

A conventional mobile unit (MU) may be configured with a display device. The display device may be configured to show data to a user such as a view for an application, a menu, a home screen, etc. The display device may further be configured to allow the user to manipulate the view. For example, the display device may be a touch screen that the user can apply a single finger and a subsequent movement moves the view on the display device to generate an updated view. In another example, the display device may allow the user to apply two fingers and a subsequent movement bringing the fingers apart may zoom into the view to generate a zoomed in view while a subsequent movement bringing the fingers together may zoom out the view to generated a zoomed out view. In handheld devices that include elements that need to be positioned in relation to external features in the environment (e.g., barcode scanner, imager, etc.), the positioning of these elements may orient other elements on the device, particularly the display device.

To alleviate issues raised from moving the MU, the conventional display device may also be configured to automatically change the view as a function of the user turning the MU. For example, if the MU is held so that the display device is disposed in a portrait view, the user may turn the MU and the display device so that the MU and display device is held in a landscape view. A motion sensor such as an accelerometer may be used to determine the direction and orientation of the MU. However, the conventional display device requires a predetermined amount of turning for the view on the display device to be updated. For example, at least a 45° turn may be required prior to the view on the display device to be changed. Once at least a 45° turn is performed, the display device may be automatically updated. However, this feature only allows for the view on the display device to only have either a portait view or a landscape view. The user may also lock the view on the display device to remove this feature. However, a turning of the MU will also turn the view on the display device resulting in the user viewing a rotated view that is not right side up relative to the user. This concept also applies to the MU including the rotating feature prior to the view being changed. In addition, only a change between a portait view and a landscape view is performed from this movement of the MU. That is, for any further functionality such as an execution or launching of an application requires a further user input (e.g., touching an icon on the view representing the application for it to launch).

Accordingly, there is a need for providing further views on the display device from a movement of the MU that may also be used for a further functionality such as launching an application.

BRIEF DESCRIPTION OF THE FIGURES

The accompanying figures, where like reference numerals refer to identical or functionally similar elements throughout the separate views, together with the detailed description below, are incorporated in and form part of the specification, and serve to further illustrate embodiments of concepts that include the claimed invention, and explain various principles and advantages of those embodiments.

Skilled artisans will appreciate that elements in the figures are illustrated for simplicity and clarity and have not necessarily been drawn to scale. For example, the dimensions of some of the elements in the figures may be exaggerated relative to other elements to help to improve understanding of embodiments of the present invention.

The apparatus and method components have been represented where appropriate by conventional symbols in the drawings, showing only those specific details that are pertinent to understanding the embodiments of the present invention so as not to obscure the disclosure with details that will be readily apparent to those of ordinary skill in the art having the benefit of the description herein.

DETAILED DESCRIPTION

The present invention describes a device and method for performing a predefined functionality. The method comprises generating first image data indicative of a first view shown on a display device of a mobile unit (MU), the first view including a plurality of selectable elements, each selectable element configured to execute a predefined functionality, the first image data including first position data and first orientation data for each of the selectable elements; determining movement data indicative of a movement of the display device relative to a user of the MU; generating second image data indicative of a second view shown on the display device as a function of the first image data and the movement data, the second view including at least one of the selectable elements, the second image data including second position data and second orientation data for each of the at least one of the selectable elements, the second position data and the second orientation data being the same as the first position data and the first orientation data, respectively, relative to the user; selecting one of the at least one of the selectable elements of the second view as a function of the second position data and the second orientation data; and executing the predefined functionality corresponding to the selected one of the selectable elements.

The exemplary embodiments may be further understood with reference to the following description and the appended drawings, wherein like elements are referred to with the same reference numerals. The exemplary embodiments describe a device and method for performing a functionality as a function of a movement of a MU that changes a view of a display device. Specifically, the movement of the MU updates the view of the display device to a moved view in which a selected or predetermined functionality is executed or application is launched. The functionality, the movement, the view, the moved view, the display device, and a related method will be discussed in further detail below.

Figure 1:
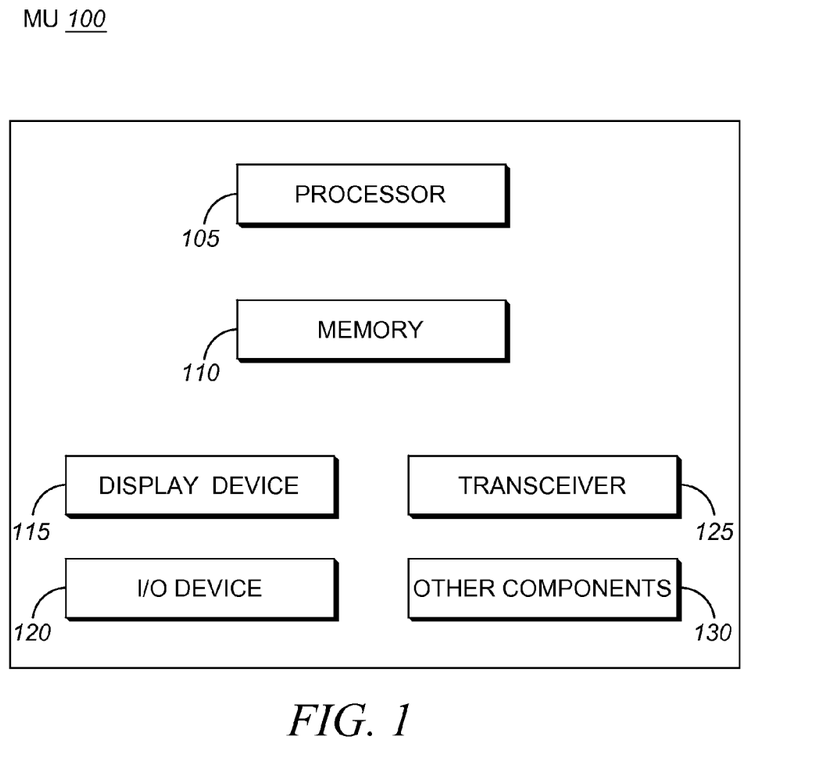
FIG. 1 illustrates components of a mobile unit in accordance with some embodiments.

FIG. 1 is a MU 100 including a plurality of components for performing a functionality as a function of a movement of the MU 100 that changes a view in accordance with an exemplary embodiment of the present invention. As illustrated, the MU 100 may be any portable device such as a mobile phone, a personal digital assistant, a smartphone, a tablet, a laptop, a barcode reader, etc. Accordingly, the MU 100 may be a handheld device in which the user is capable of moving the MU 100. The movement of the MU 100 may be a rotational movement or a translational movement. The MU 100 may include a processor 105, a memory arrangement 110, a display device 115, an input/output (I/O) device 120, a transceiver 125, and other components 130 such as a portable power supply (e.g., battery).

The processor 105 may provide conventional functionalities for the MU 100. For example, the MU 100 may include a plurality of applications that are executed on the processor 105 such as an application including a web browser when connected to a communication network via the transceiver 125. The memory 110 may also provide conventional functionalities for the MU 100. For example, the memory 110 may store data related to operations performed by the processor 105. As will be described in further detail below, the processor 105 may provide a feature that allows the user to maintain an orientation and a position of a view even when the user performs a movement on the MU 100. Accordingly, the memory 110 may store an initial view for an updated view to be shown. The transceiver 125 may be any conventional component configured to transmit and/or receive data. The transceiver 125 may therefore enable communication with other electronic devices directly or indirectly through a network.

The display device 115 may be any component configured to show data to a user. The display device 115 may be, for example, a liquid crystal display (LCD) to conform to the size of the electronic device 100. The I/O device 120 may be any component configured to receive an input from the user. For example, the I/O device 120 may be a keypad (e.g., alphanumeric keypad, numeric keypad, etc.). The I/O device 120 may also be a touch sensing pad for a user to enter inputs manually with a finger(s) or a stylus. It should be noted that the display device 115 may also incorporate the I/O device 120, particularly when the I/O device 120 is a touch sensing pad including an area in which the user may enter inputs. In another example, the I/O device 120 may be a transparent touch sensor placed on top of the display 115 that enables a user to enter inputs.

According to the exemplary embodiments, the display device 115 may be configured to maintain an orientation and a position of selectable elements such as icons in a view thereon even subsequent to the user moving the MU 100 in a rotational manner and/or a translational manner. The processor 105 may capture an image of the view on the display device 115 and store the image data on the memory 110. According to a first exemplary embodiment, the image data may be predetermined. That is, the image data may have fixed dimensions, in particular dimensions which are larger than the dimensions of the display device 115. Thus, the display device 115 may show a portion of the image data thereon. When the MU 100 is moved, the processor 105 may determine the portions of the image data to be shown on the display device 115. According to a second exemplary embodiment, the image data may be dynamic. That is, the image data shown on the display device 115 may be updated upon the MU 100 being moved in a rotational or a translational manner. The processor 105 may therefore determine the portions of the image data that should no longer be shown on the display device 115 while also determining further portions of the image data that should be shown on the display device 115. As will be discussed in further detail below, the orientation of the elements in the image or the entire image shown on the display device 115 may be maintained. That is, the image may remain in a fixed orientation with respect to the user even after the MU 100 is rotated. Furthermore, the position of the elements in the image or the entire image shown on the display device 115 may be maintained. That is, the relative position of points in the image may remain fixed with respect to the user even after the MU is translated. Accordingly, the portions of the image remaining to be shown on the display device 115 after the MU 100 undergoes a translational movement remains a fixed distance from the user.

The processor 105 may determine how to maintain the image on the display device 115 using a variety of factors. The orientation and relative movement with respect to the user of the MU 100 may be determined. These factors may be based upon, for example, the ground (e.g., using an accelerometer), the user (e.g., using a front facing camera or imager), a proximity sensor, or other external physical feature (e.g., also using a camera or imager). Accordingly, the other components 130 may include a sensor such as a movement sensor (e.g., accelerometer), an image sensor (e.g., camera), etc. The orientation of the MU 100 may also be used for determining how to show the image data on the display device 115. For example, the MU 100 may be rotated in a variety of manners (e.g., pitch, roll, yaw). The processor 105 may determine the type of rotational movement to determine the image data to be shown. The position of the MU 100 may further be used for determining how to show the image data on the display device 115. For example, the MU 100 may be translated in a variety of manners (e.g., up, down, left, right). The processor 105 may be configured to adjust the presentation of the image data on the display device 115 using any combination of the above noted factors.

It should be noted that the features of the exemplary embodiments of the present invention may be manually activated or deactivated. That is, the user may allow the features to be used or not. The user may launch a user interface for settings of the MU 100. The user interface may include an option to allow the user to activate the features. Once activated, the display device 115 may be configured according to the exemplary embodiments of the present invention.

Figure 2:
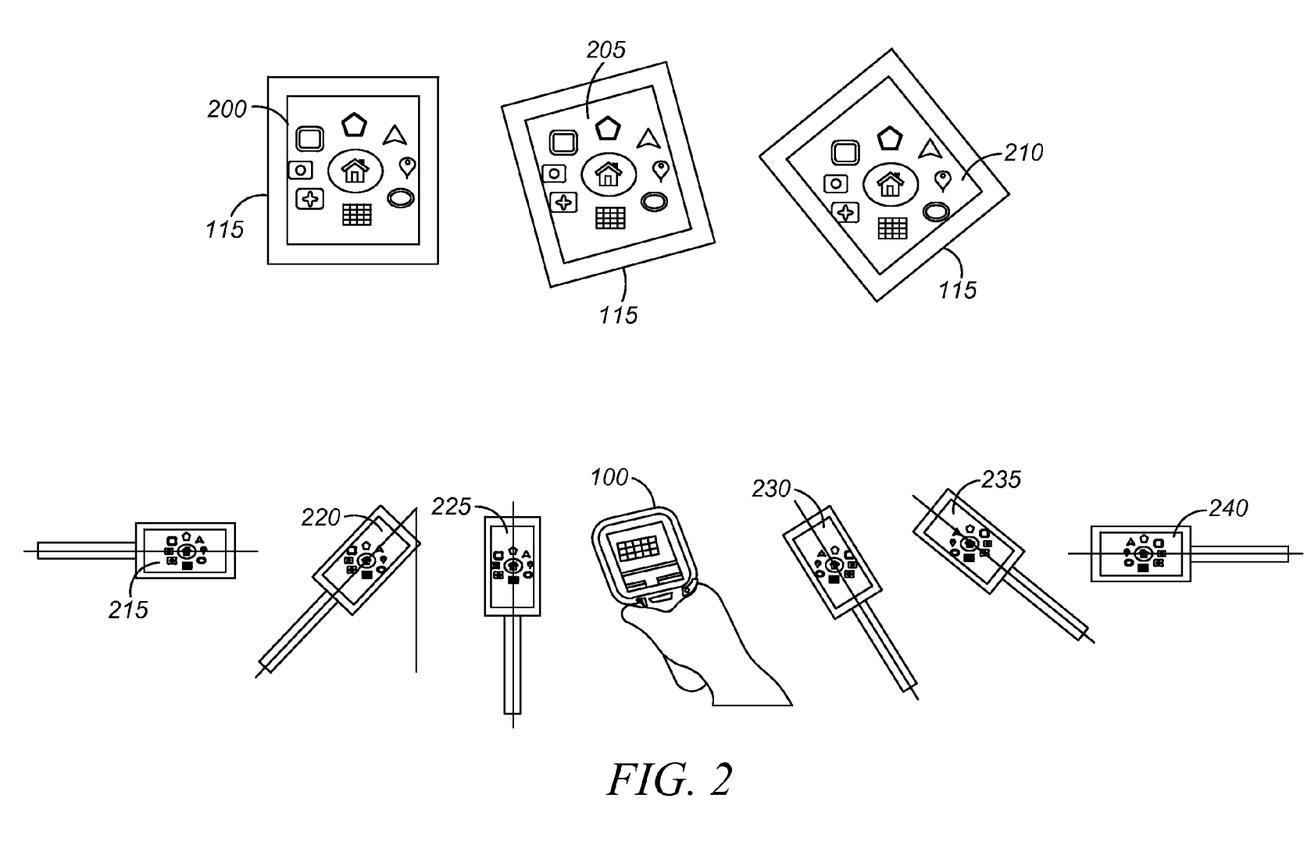
FIG. 2 illustrates the display device of the mobile unit of FIG. 1 for maintaining a view from a rotation in accordance with some embodiments.

FIG. 2 illustrates the display device 115 of the MU 100 of FIG. 1 for maintaining a view from a rotation in accordance with some embodiments. The image data 200 shown on the display device 115 may represent an original view. That is, the icons on the image data 200 may be shown in a standard portrait mode (e.g., length greater than width). The dimensions of the original view of the image data 200 may correspond to the dimensions of the display device 115. The icons shown on the image data 200 may also be oriented in a manner relative to the user (e.g., right side up). The user of the MU 100 may choose to rotate the MU 100. For example, the user may choose to rotate the MU 100 30° counter-clockwise. As illustrated, the image data 205 shown on the display device 115 may correspond to such a rotational movement. According to the exemplary embodiments of the present invention, an orientation of the image data may be maintained. That is, the orientation of the image data 200 and the image data 205 are the same. Therefore, the icons shown in the image data 200 may be constant when being updated to the image data 205 after a 30° counter-clockwise rotational movement is performed on the MU 100. Thus, the icons remain in the same orientation relative to the user as was the case in image data 200. The processor 105 may determine that portions of the image data 200 are to be removed for this updated view (e.g., top right corner and bottom left corner) while further portions are required to be shown in the image data 205 (e.g., top left corner and bottom right corner). In a substantially similar manner, if the user chooses to rotate the MU 100 70° counter-clockwise from the original position corresponding to the image data 200, the image data 210 may be shown on the display device 115. As discussed above, the locations and orientations of the icons may remain constant.

Image data 215-240 illustrates a further example of the orientation and location of the icons remaining constant when the MU 100 is rotated 180° in a counter-clockwise manner. In image data 215, the MU 100 may be oriented so that a handle of the housing extends towards the left (e.g., 0° position). Accordingly, the image data 215 may be shown in a standard landscape setting. In image data 220, the MU 100 may be rotated 45°. In this rotated position, as discussed above, the orientation of the view of the image data 220 remains constant relative to the image data 215. In image data 225, the MU 100 may be rotated 90°. Thus, the image data 225 may be shown in a standard portrait setting. In image data 230, the MU 100 may be rotated 100°; in image data 235, the MU 100 may be rotated 135°; and in image data 240, the MU 100 may be rotated 180°. In each subsequent rotational move, the view of the image data 230-240 may be maintained so that the orientation and position are constant, particularly the icons being in a constant view relative to the user.

Figure 3:
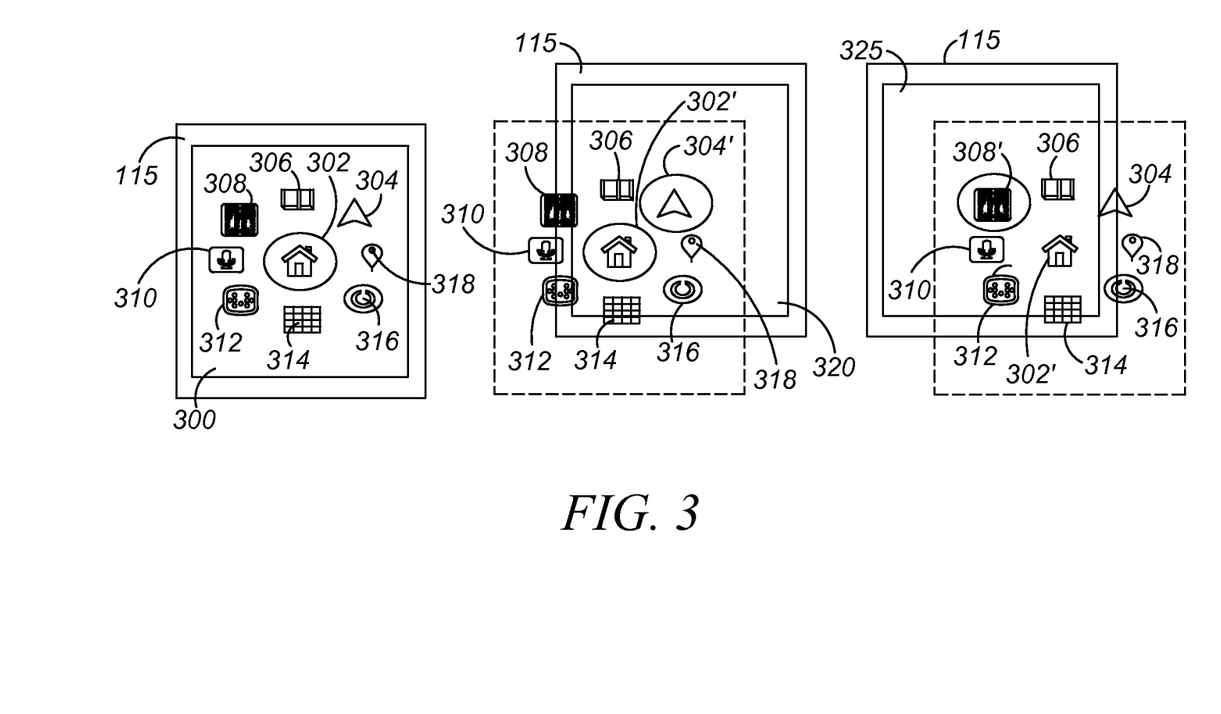
FIG. 3 illustrates the display device of the mobile unit of FIG. 1 for maintaining a view from a translation in accordance with some embodiments.

FIG. 3 illustrates the display device of the mobile unit of FIG. 1 for maintaining a view from a translation in accordance with some embodiments. The image data 300 shown on the display device 115 may represent an original view. That is, the icons on the image data 300 may again be shown in a standard portrait mode (e.g., length greater than width). The dimensions of the original view of the image data 300 may correspond to the dimensions of the display device 115. However, as discussed above, the image data 300 may have greater dimensions than the dimensions of the display device 115 in which case the processor 105 is configured to store the entire image data 300 or adjust accordingly in a dynamic manner. The icons shown on the image data 300 may also be oriented in a manner relative to the user (e.g., right side up). The user of the MU 100 may choose to move the MU 100 translationally. For example, the user may choose to move the MU 100 up, down, left, and/or right. As illustrated, the image data 320 shown on the display device 115 may correspond to an up and right translational movement. According to the exemplary embodiments of the present invention, a position of the image data may be maintained. That is, the position of the image data 300 and the image data 330 are the same. Therefore, the icons shown in the image data 300 may be constant when being updated to the image data 320 after a translation up and to the right is performed on the MU 100. Thus, the icons remain in the same position relative to the user as was the case in image data 300. The processor 105 may determine that portions of the image data 300 are to be removed for this updated view (e.g., left side and bottom side) while further portions are required to be shown in the image data 320 (e.g., top side and right side). Furthermore, as the icons remain in the same position, some of the icons may be removed from the view. As shown in image data 300, all the icons 302-318 may be shown. However, in image data 320, the icons 308, 310, and 312 may be removed as the MU 100 has been moved enough to place these icons outside the viewing of the display device 115. The icon 314 however, may be partially shown as the MU 100 has been moved in a manner that the top portion of the icon 314 is still visible within the display device 115. In a substantially similar manner, if the user chooses to move the MU 100 translationally up and to the left from the original position corresponding to the image data 300, the image data 325 may be shown on the display device 115. As discussed above, the locations and orientations of the icons may remain constant. Furthermore, in this scenario, the icons 304, 316, and 318 may be removed from the view of the display device 115 while the icon 314 again partially remains within the view of the display device 115.

It should be noted that the image data shown on the display device 115 may be updated in a dynamic manner. That is, when the MU 100 is moved translationally, rotationally, or both, the processor 105 may continuously update the image data shown on the display device 115. Accordingly, if the display device 115 is moved from a first position to a second position, the image data is continuously shown with the elements therein maintaining the orientation and position throughout the movement from the first position to the second position.

According to the exemplary embodiments of the present invention, the movement of the MU 100 and the features for maintaining the position and orientation of the view on the display device may further be used to activate a functionality or launch an application. As shown in FIG. 3, the icons 304-318 may be selected to launch a corresponding application or activate a functionality. The icon 302 may represent a home or central icon. The home icon 302 may be, for example, a location within the image data 300 when no action is to be taken or the operating system installed on the MU 100 is to go "back" or return to a home state. Furthermore, as shown in image data 300, the MU 100 may be disposed in a position so that the icon 302 is selected. This may illustrate to the user that the icon 302 has been selected from the movement performed on the MU 100. In a substantially similar manner, when the MU 100 is moved up and to the right corresponding to the image data 320, the icon 304 may be selected. When selected, the icon 304' results in which the icon may be enlarged and highlighted around the icon. That is, the icon 304' may be updated with visual features indicative of the selection. Further visual features such as a change in color may also be used. The previously selected icon 302 in image data 300 may be deselected in which case the icon 302' results that is resized to an original size (e.g., same size as other non-selected icons). When the MU is moved up and to the left corresponding to the image data 325, the icon 308 may be selected. Thus, the icon 308' may result that is enlarged and highlighted.

When the desired icon has been selected, the processor 105 may be configured to automatically launch a corresponding application or perform a corresponding functionality. This action may be performed in a variety of ways. In a first example, the processor 105 may be configured to wait a predetermined amount of time (e.g., 2 seconds) so that when the icon is continuously selected, the processor 105 determines that the corresponding action of the icon is to be performed. In a second example, upon the icon being selected, the user may manually provide an input on the display device 115 (e.g., I/O device 120 incorporated for a touch screen) that selects the icon to perform the corresponding action.

The MU 100 may further be configured to incorporate other movements for the performing of a functionality. As discussed above, the rotational movements are not restricted to a turn within a common plane (e.g., yaw). The MU 100 may also be rotated with a roll or a pitch. Using the features for maintaining the position and orientation of the view on the display device 100, the user of the MU 100 may perform a pitch forward to change a selection of the icon. For example, with regard to image data 300, when a pitch forward is performed, the processor 105 may receive this movement input data and move the selection from the icon 302 to the icon 306. In such a scenario, the icon 306 may be selected, highlighted, and enlarged while the icon 302 is deselected and resized. The image data 300 may remain constant during this pitch rotational movement. That is, the image data 300 may only be updated when a yaw rotational movement or a translational movement is performed. In a further exemplary embodiment, the processor 105 may update the image data 300 for additional movements. For example, with a pitch rotational movement, the processor 105 may generate a perspective view so that the image data shown on the display device 115 is maintained with respect to the user. Specifically, with a pitch forward rotational movement, the processor 105 may resize the image data 300 so that an upper portion is widened and zoomed out while a bottom portion is shortened and zoomed in. In this manner, the view of the image data may be substantially the same prior to and after the pitch forward rotational movement.

It should be noted that the exemplary embodiments of the present invention relating to visual indicators is only exemplary. According to further exemplary embodiments of the present invention, non-visual indicators may also be utilized alone or in combination with the visual indicators. For example, when an icon in the image data is selected, audio data may be played on an audio output component of the MU 100. In a specific example, if the home icon (e.g., icon 302) is selected, a prerecorded "home" tone may be played on the audio output component such as saying the word "home" or a predetermined sound indicative of the home icon. When another icon is selected such as a barcode scan icon (e.g., icon 308), a prerecorded tone may be played on the audio output component such as saying the word "barcode scan" or a predetermined sound indicative of the barcode scan icon. The audio data may be played individually or in combination with the visual indicator as discussed above. In another example, an icon may be selected on the image data to provide haptic feedback. For example, when an icon is selected, a predetermined haptic output may be performed by the MU 100. In a specific example, if the home icon (e.g., icon 302) is selected, the MU 100 may include a vibration generating component that generates a vibration that is indicative of the home icon (e.g., continuous vibration for a predetermined amount of time). In another example, if another icon such as the barcode scan icon is selected, the vibration generating component may generate a different type of haptic feedback (e.g., predetermined number of vibrations spaced apart from one another). In this manner, the exemplary embodiments of the present invention may incorporate haptic feedback individually, in combination with other non-visual indicators, in combination with the visual indicators as discussed above, or any combination thereof. Accordingly, the types of visual indicators and the types of non-visual indicators may be combined in any manner to indicate to the user the selection/deselection of a particular icon or functionality.

Figure 4:
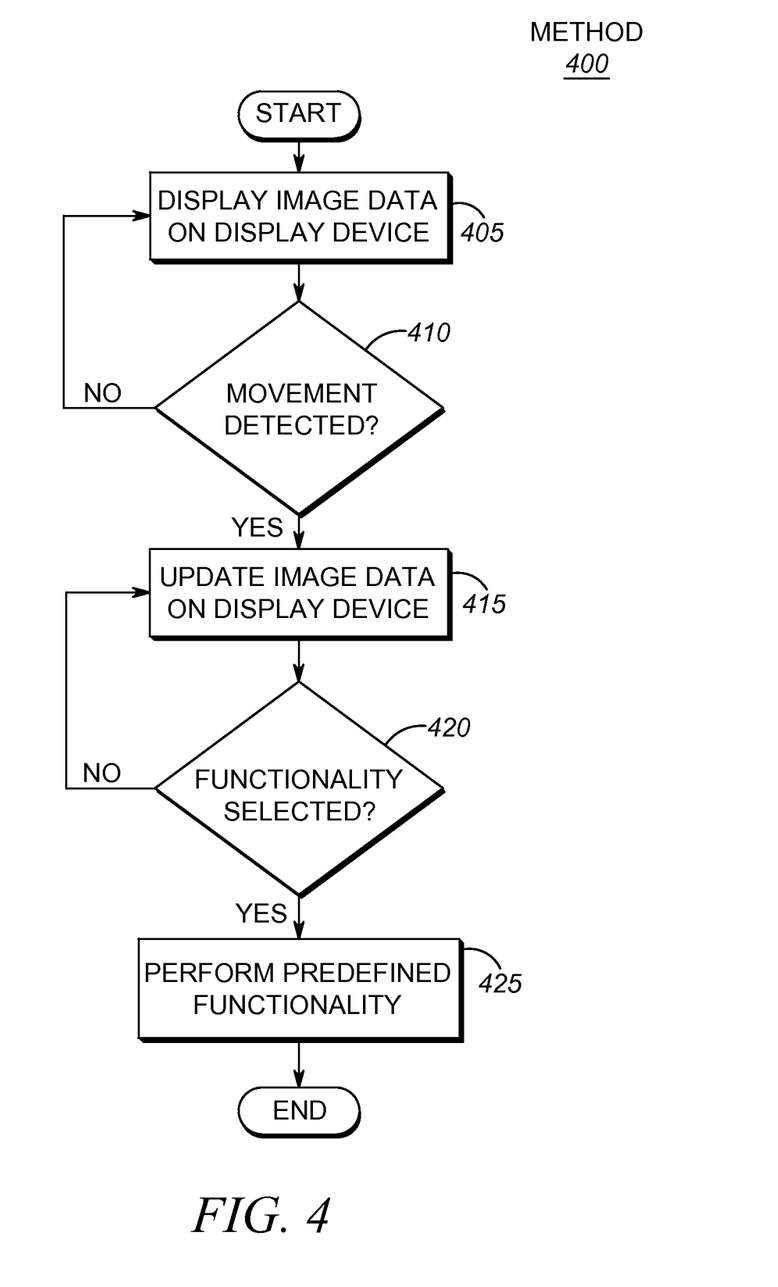
FIG. 4 illustrates a flowchart of a method for performing a functionality as a function of a movement of the mobile unit in accordance with some embodiments.

FIG. 4 illustrates a flowchart of a method 400 for performing a functionality as a function of a movement of the mobile unit in accordance with some embodiments. Specifically, the MU 100 may be configured to maintain a position and orientation of elements shown on a view of a display device after a movement of the MU 100 as well as perform a functionality from the movement. The method 400 will be described with reference to the MU 100 of FIG. 1 and the types of movements shown in FIGS. 2 and 3.

In step 405, image data is shown on the display device 115. As discussed above, the processor 105 is configured to run at least one application such as an operating system. The operating system may have a home screen in which a plurality of icons or selectable elements are shown. With reference to the image data 300, the icons 302-318 may be shown.

In step 410, a determination is made whether a movement of the MU 100 is detected. Specifically, the determination relates to whether the display device 115 is moved. As discussed above, the movement may be a rotational movement (e.g., roll, pitch, yaw) and/or a translational movement (e.g, up, down, left, right). Thus, the user of the MU 100 may move the display device 115 in a variety of manners. If no movement is determined, the method 400 returns to step 405 where the image data shown originally is continued to be shown. If movement is determined, the method 400 continues to step 415.

In step 415, the image data shown on the display device 115 is updated. As discussed above, if a rotational movement is detected, the position and orientation of elements of the image data or the entire image data may be maintained. Thus, if the display device 115 is rotated with respect to yaw such as with the image data 200 and the image data 205, the processor 105 may determine the updated, moved view on the display device 115. If a translational movement is detected, the position and orientation of elements of the image data or the entire image data may be maintained. Thus, if the display device 115 is moved translationally such as the image data 300 and the image data 320, the processor 105 may again determine the updated, moved view on the display device 115. If both a rotational and a translational movement is detected, the position and orientation of elements of the image data or the entire image data may be maintained. Thus, if the display device 115 is moved with both types of movements, the processor 105 may determine the updated, moved view on the display device 115.

In step 420, the processor 105 determines if a functionality is selected. If no functionality is selected, the method 400 returns to step 415 where the updated, moved image is continued to be shown on the display device 115. However, if a predefined functionality is selected, the method 400 continues to step 425. As discussed above, the image data 300 may select the icon 302 that corresponds to a predefined functionality. Subsequently, if the display device 115 is moved in a translational manner such as up and to the right, a selection functionality may be triggered so that the icon 304 may be selected. Thus, in step 425, the defined functionality is performed. As discussed above, the functionality may be performed in a variety of manners. For example, the processor 105 may automatically activate and perform the selected predefined functionality. In another example, the user may manually enter an input to perform the selected functionality.

The exemplary embodiments of the present invention provide a device and method for performing a functionality as a function of a movement of a MU that changes a view of a display device. The movement of the MU and the display device may be with regard to a rotational movement and/or a translational movement. The processor of the MU is configured to update the view on the display device as a function of the performed movement. Subsequently, the processor of the MU may be configured to perform a functionality as a function of the performed movement. For example, a selection functionality may be triggered so that an icon corresponding to the selected functionality may be altered such as changing a size or display of the icon.

In the foregoing specification, specific embodiments have been described. However, one of ordinary skill in the art appreciates that various modifications and changes can be made without departing from the scope of the invention as set forth in the claims below. Accordingly, the specification and figures are to be regarded in an illustrative rather than a restrictive sense, and all such modifications are intended to be included within the scope of present teachings.

The benefits, advantages, solutions to problems, and any element(s) that may cause any benefit, advantage, or solution to occur or become more pronounced are not to be construed as a critical, required, or essential features or elements of any or all the claims. The invention is defined solely by the appended claims including any amendments made during the pendency of this application and all equivalents of those claims as issued.

Moreover in this document, relational terms such as first and second, top and bottom, and the like may be used solely to distinguish one entity or action from another entity or action without necessarily requiring or implying any actual such relationship or order between such entities or actions. The terms "comprises," "comprising," "has", "having," "includes", "including," "contains", "containing" or any other variation thereof, are intended to cover a non-exclusive inclusion, such that a process, method, article, or apparatus that comprises, has, includes, contains a list of elements does not include only those elements but may include other elements not expressly listed or inherent to such process, method, article, or apparatus. An element proceeded by "comprises . . . a", "has . . . a", "includes . . . a", "contains . . . a" does not, without more constraints, preclude the existence of additional identical elements in the process, method, article, or apparatus that comprises, has, includes, contains the element. The terms "a" and "an" are defined as one or more unless explicitly stated otherwise herein. The terms "substantially", "essentially", "approximately", "about" or any other version thereof, are defined as being close to as understood by one of ordinary skill in the art, and in one non-limiting embodiment the term is defined to be within 10%, in another embodiment within 5%, in another embodiment within 1% and in another embodiment within 0.5%. The term "coupled" as used herein is defined as connected, although not necessarily directly and not necessarily mechanically. A device or structure that is "configured" in a certain way is configured in at least that way, but may also be configured in ways that are not listed.

It will be appreciated that some embodiments may be comprised of one or more generic or specialized processors (or "processing devices") such as microprocessors, digital signal processors, customized processors and field programmable gate arrays (FPGAs) and unique stored program instructions (including both software and firmware) that control the one or more processors to implement, in conjunction with certain non-processor circuits, some, most, or all of the functions of the method and/or apparatus described herein. Alternatively, some or all functions could be implemented by a state machine that has no stored program instructions, or in one or more application specific integrated circuits (ASICs), in which each function or some combinations of certain of the functions are implemented as custom logic. Of course, a combination of the two approaches could be used.

Moreover, an embodiment can be implemented as a computer-readable storage medium having computer readable code stored thereon for programming a computer (e.g., comprising a processor) to perform a method as described and claimed herein. Examples of such computer-readable storage mediums include, but are not limited to, a hard disk, a CD-ROM, an optical storage device, a magnetic storage device, a ROM (Read Only Memory), a PROM (Programmable Read Only Memory), an EPROM (Erasable Programmable Read Only Memory), an EEPROM (Electrically Erasable Programmable Read Only Memory) and a Flash memory. Further, it is expected that one of ordinary skill, notwithstanding possibly significant effort and many design choices motivated by, for example, available time, current technology, and economic considerations, when guided by the concepts and principles disclosed herein will be readily capable of generating such software instructions and programs and ICs with minimal experimentation.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separately claimed subject matter.

We claim:

1. A method, comprising:
generating first image data indicative of a first view shown on a display device of a mobile unit (MU), the first view including a plurality of selectable elements, each selectable element configured to execute a predefined functionality, the first image data including first position data and first orientation data for each of the selectable elements;
determining movement data indicative of a movement of the display device relative to an external physical feature viewed by an image sensor of the MU;
generating second image data indicative of a second view shown on the display device as a function of the first image data and the movement data, the second view including at least one of the selectable elements, the second image data including second position data and second orientation data for each of the at least one of the selectable elements, the second position data and the second orientation data remaining the same as the first position data and the first orientation data, respectively, relative to the external physical feature viewed by the image sensor of the MU as the display device is moved;

selecting one of the at least one of the selectable elements of the second view as a function of the second position data, the second orientation data, and the movement data indicative of the movement of the display device; and executing the predefined functionality corresponding to the selected one of the selectable elements, wherein, in response to a translational movement of the MU, the second position data is maintained the same as the first position data relative to the external physical feature viewed by the image sensor of the MU by determining at least one of a portion of the first view, including a first subset of the plurality of selectable elements, to be removed from the second view and a further view, including a second subset of the plurality of selectable elements, to be added to the first view as part of the second view.

2. The method of claim 1, wherein the movement is one of the translational movement, a rotational movement, and a combination thereof, wherein the translational movement is one of an upward movement, a downward movement, a leftward movement, a rightward movement, and a combination thereof.

3. The method of claim 1, wherein the external physical feature is the user as viewed from a front facing camera the MU.

4. The method of claim 2, wherein the rotational movement includes a yaw movement, and wherein the determining step further includes determining a pitch movement, a roll movement, and a combination thereof, whereupon the generating step includes changing a selection indication of a selectable element.

5. The method of claim 4, wherein, when the pitch or roll movement cause a sizing change of an image displayed on the display device.

6. The method of claim 1, wherein the second image data is generated continuously throughout the movement of the display device.

7. The method of claim 1, further comprising:

generating selection image data for the selected one of the at least one of the selectable elements, the selection image data including at least one visual feature, wherein when the visual feature continuously selects an element for a predetermined amount of time, the predefined functionality of that selected element is executed automatically.

8. The method of claim 7, wherein the at least visual feature includes an increase in size, a change in color, a highlight around the selected selectable element, and a combination thereof.

9. The method of claim 7, further comprising:

generating deselection image data for a previously selected one of the at least one of the selectable elements, the deselection image data removing the at least one visual feature.

10. The method of claim 1, wherein the functionality is executed one of automatically and manually.

11. A mobile unit (MU), comprising:

a display device configured to show first image data indicative of a first view shown thereon, the first view including a plurality of selectable elements, each selectable element configured to execute a predefined functionality, the first image data including first position data and first orientation data for each of the selectable elements;

a processor configured to generate the first image data, the processor further configured to execute the predefined functionality;

a memory storing the first image data; and an image sensor configured to generate movement data indicative of a movement of the display device relative to an external physical feature viewed by the image sensor of the MU, wherein the processor is configured to generate second image data indicative of a second view shown on the display device as a function of the first image data and the movement data, the second view including at least one of the selectable elements, the second image data including second position data and second orientation data for each of the at least one of the selectable elements, the second position data and the second orientation data remaining the same as the first position data and the first orientation data, respectively, relative to the external physical feature viewed by the image sensor of the MU as the display device is moved, wherein the processor is configured to select one of the at least one of the selectable elements of the second view as a function of the second position data, the second orientation data, and the movement data indicative of the movement of the display device, and wherein the processor is configured to execute the predefined functionality corresponding to the selected one of the selectable elements, wherein, in response to a translational movement of the MU, the second position data is maintained the same as the first position data relative to the external physical feature viewed by the image sensor of the MU by determining at least one of a portion of the first view, including a first subset of the plurality of selectable elements, to be removed from the second view and a further view, including a second subset of the plurality of selectable elements, to be added to the first view as part of the second view.

12. The MU of claim 11, wherein the movement is one of the translational movement, a rotational movement, and a combination thereof, and wherein the translational movement is one of an upward movement, a downward movement, a leftward movement, a rightward movement, and a combination thereof.

13. The MU of claim 11, wherein the external physical feature is the user as viewed from a front facing camera the MU.

14. The MU of claim 11, wherein the rotational movement is defined as a yaw movement, and wherein the determining step further includes determining a further a pitch movement, a roll movement, and a combination thereof, whereupon the generating step includes changing a selection indication of a selectable element.

15. The MU of claim 14, wherein, when the pitch or roll movement cause a sizing change of an image displayed on the display device.

16. The MU of claim 11, wherein the processor is configured to continuously generate the second image data throughout the movement of the display device.

17. The MU of claim 11, wherein the processor is configured to generate selection image data for the selected one of the at least one of the selectable elements, the selection image data including at least one visual feature, wherein when the visual feature continuously selects an element for a predetermined amount of time, the predefined functionality of that selected element is executed automatically.

18. The MU of claim 17, wherein the at least visual feature includes an increase in size, a change in color, a highlight around the selected selectable element, and a combination thereof.

19. The MU of claim 17, wherein the processor is configured to generate deselection image date for a previously selected one of the at least one of the selectable elements, the deselection image data removing the at least one visual feature.

* * * * *